United States Patent [19]

Yong et al.

[11] Patent Number: 4,839,060
[45] Date of Patent: Jun. 13, 1989

[54] METHYLATED STARCH COMPOSITIONS AND THEIR USE AS FLOCCULATING AGENTS FOR MINERAL WASTES, SUCH AS BAUXITE RESIDUES

[75] Inventors: Raymond N. Yong, Beaconsfield; Amar J. Sethi, Fort McMurray, both of Canada

[73] Assignee: Suncor, Inc., North York, Canada

[21] Appl. No.: 110,815

[22] Filed: Oct. 21, 1987

[30] Foreign Application Priority Data

Apr. 28, 1987 [CA] Canada ............................ 535765

[51] Int. Cl.⁴ .......................... C02F 1/54; B03D 3/06
[52] U.S. Cl. .................................. 210/731; 423/122; 423/42; 423/55; 423/65; 423/92; 423/140; 423/158; 423/184; 423/111; 210/729; 210/728; 210/705; 75/2; 252/60; 252/61; 536/102; 536/107; 127/33; 127/32; 127/70; 127/71
[58] Field of Search ............... 423/122, 42, 55, 65, 423/92, 140, 158, 184, 111, 121; 210/731, 705, 729, 728; 209/5; 75/2; 536/102, 107; 252/60, 61; 127/33, 32, 70, 71

[56] References Cited

U.S. PATENT DOCUMENTS

| | | | |
|---|---|---|---|
| 2,806,766 | 9/1957 | Anderson | 423/129 |
| 3,127,239 | 3/1964 | Cook | 423/131 |
| 3,142,637 | 7/1964 | Cook et al. | 209/5 |
| 3,390,959 | 7/1968 | Sibert et al. | 423/122 |
| 3,669,915 | 6/1972 | Jones et al. | 209/5 |
| 3,975,496 | 8/1976 | Smalley et al. | 423/122 |

FOREIGN PATENT DOCUMENTS

| | | | |
|---|---|---|---|
| 2158130 | 6/1973 | Fed. Rep. of Germany | 423/122 |
| 0279603 | 2/1978 | U.S.S.R. | 423/122 |
| 634440 | 3/1950 | United Kingdom | 209/5 |
| 688291 | 3/1953 | United Kingdom | 121/33 |
| 1230332 | 4/1971 | United Kingdom | 423/122 |

*Primary Examiner*—Robert L. Stoll
*Assistant Examiner*—Paige C. Harvey
*Attorney, Agent, or Firm*—Paul Lipsitz

[57] ABSTRACT

Modified starch compositions and their use for flocculating mineral waste residues, particularly the red mud containing alumina liquors from bauxite residues, comprising the addition to an alumina liquor of a flocculating amount of a methylated starch which, optionally, may be hydrolyzed, or a methylated starch which is also sulfonated and, optionally, may be hydrolyzed. Preferably, the methylated starch compositions are potato and dasheen starch derivatives prepared at temperatures of about 50° to about 85° C.

16 Claims, No Drawings

METHYLATED STARCH COMPOSITIONS AND THEIR USE AS FLOCCULATING AGENTS FOR MINERAL WASTES, SUCH AS BAUXITE RESIDUES

BACKGROUND OF THE INVENTION

This invention is related to novel flocculating agents for aqueous dispersions of mineral wastes, their preparation and method of use, particularly for flocculating the bauxite residue from the production of alumina (red mud).

The production of alumina from bauxite is carried out by use of the well-known Bayer process. Essentially, the Bayer process is an alkaline extractive hydrometallurgical process which involves dissolution of the aluminum oxyhydroxides, gibbsite ($Al(OH)_3$) and boehmite and/or diaspore ($Al_2O_3 \cdot H_2O$) present in bauxite, with caustic soda at elevated temperatures and pressures. The process is based on the variation in the solubility of gibbsite, boehmite and diaspore with increasing caustic soda concentration.

In practice, bauxite is slurried in caustic soda solution and digested at temperatures ranging from 140° to 250° C. This results in the formation of a slurry consisting of a saturated sodium aluminate ($Na\,Al\,(OH)_4$) liquid phase and a caustic insoluble bauxite residue which is commonly called red mud or ferrosilt. Subsequent processing involves separation of the solid phase from the saturated sodium aluminate liquor by use of decantation or other techniques. The liquid phase is further clarified by filtration to remove the last traces of red mud and is finally transported to the precipitation or decomposition operation in which previously precipitated gibbsite seeds (crystals) are added to induce precipitation. The gibbsite generated is washed and calcined at temperatures ranging from 1000° to 1200° C. to drive off free moisture and water of crystallization. The calcined alumina is cooled, stored and transported to smelters.

The red mud produced is washed in a counter current decantation (CCD) system to recover valuable solutes associated with it. The red mud is finally discharged from the battery limits of the alumina plant into impoundment areas which may be natural depressions, mined out bauxite pits or artificial lakes, in the case of disposal on land.

The red mud residues produced in the alumina recovery process comprise very fine particles which are very difficult to remove, yet for the sake of efficiency of the process these red muds, which usually constitute from about 5% to about 30% of the ore, must be quickly and cleanly removed from the solubilized alumina liquor.

As disclosed in U.S. Pat. No. 3,390,959, it is known in the industry to speed up the separation of red muds from alumina liquors by adding various flocculating agents such as starch or starch derivatives, acrylic-acid-acrylate homopolymers, acrylamide derivatives, imidazoles and various other agents. However, these agents are not fully acceptable for one or more reasons: e.g. cost, effectiveness, causation of problems in further processing, and the like.

This invention provides a novel agent for flocculation of red mud in alumina liquors and similar highly dispersed aqueous systems which gives significantly improved separation of the dispersed particulates and thus enables more efficient processing to be obtained.

BRIEF DESCRIPTION OF THE INVENTION

This invention provides methylated starch compositions and a process for their use as flocculant compositions. These flocculants are derived from starch which is methylated and will thereby contain methoxy and acetal groups and the methylated starch may be further treated by hydrolysis, by sulfonation or by sulfonation followed by hydrolysis. Although some of the flocculants of the invention are useful for flocculating various other types of mineral waste dispersions, the following detailed description of the invention will illustrate the treatment of red muds from bauxite processing with the modified starch flocculants.

DETAILED DESCRIPTION OF THE INVENTION

As indicated above, the flocculants used in the process of the invention are derived from starch which may be any one of a number of starches such as starch derived from wheat, potatoes, corn, the various yams including the numerous Jamaican yams, cassava, dasheen and the like. Preferably, wheat, corn, potato, dasheen, cassava and yam starches will be used and most preferably, wheat and potato starch will be employed. Other starch-like materials are also useful such as the various gums; e.g., guar gum, acacia gum, ghatti gum, gum tragacanth and the like.

As indicated, the starch is modified by methylation. However, the methylated starch may be further treated by sulfonation and the methylated or methylated-sulfonated starch may be further hydrolyzed.

The methylation and sulfonation of starch is known and may be carried out by various methods. Although the prior art methylation and sulfonation techniques may, in general, be used, certain preferred techniques will be described and illustrated. Thus, the methylation of the starch is preferably accomplished by using methyl iodide in the presence of silver oxide. If the starch is further sulfonated, sulfonation is preferably carried out by using a material capable of generating sulfur trioxide (e.g. sodium bisulfite in the presence of lime or other base). The methylation reaction with starch effects the introduction of acetal ($-CH_2OH$) groups and methoxy ($-OCH_3$) groups to the starch and the sulfonation procedure attaches a sulfonic acid group ($-SO_2OH$) to the starch. While the methylation and sulfonation may be carried out at temperatures of from about 50° C. to about 150° C., it is preferred to use temperatures from about 50° C. to about 85° C. for the reactions as the starch flocculants made at this temperature generally have better flocculating ability for the bauxite tailings. Most preferably, the lower temperature of about 50° C. will be used for the modification reaction as the starch derivatives made at this lower temperature are often the most effective.

It will be understood that the effectiveness of the flocculants will vary to some extent, depending upon the various parameters used in making them. Thus for example, with potato starch the higher temperature of preparation has a greater adverse effect than it does with dasheen starch. Also, dosage is a factor in the effectiveness of the starch derivatives and appropriate dosages are readily determined by the skilled art worker.

PREPARATION OF METHYLATED STARCH

The starch is first dispersed in water at a 0.5% starch concentration and the pH adjusted to about 2.5 with hydrochloric acid or an alum solution and the dispersion heated to a temperature from about 80° C. to boiling until a slightly milky suspension of starch is obtained. Alternatively, a similar dispersion may be obtained by dispersing the starch in water which is heated to about 150° C. under pressure for at least about 2.5 hours.

Methylation, as indicated above, is achieved, preferably, by heating the starch dispersion with methyl iodide in the presence of silver oxide at about 150° C. for about 2 hours. After the methylation reaction is completed the reaction product is generally treated with a small amount of lime to reduce the acidity of the product to a pH of about 7.0.

PREPARATION OF METHYLATED-SULFONATED STARCH

Sulfonation of the methylated starch dispersion is carried out by addition of sodium bisulfite and a small amount of lime to the aqueous dispersion of methylated starch followed by heating with stirring at about 50° C. for about one hour.

It will be understood that other conventional techniques for methylation and sulfonation of the starch are also useful to prepare the flocculants used in the invention.

HYDROLYSIS OF THE METHYLATED/SULFONATED STARCH

As indicated above, a further hydrolysis step may be employed which often enhances the effectiveness of the methylated/sulfonated starch. For this hydrolysis step, the aqueous modified starch dispersion is heated with stirring at a temperature of from about 50° C. to about 150° C. for about one hour in the presence of trisodium phosphate ($Na_3PO_4$) and sodium aluminate ($Na_2Al_2O_3$).

Since the flocculants used in the invention are highly effective, they are added to the bauxite tailings at a very low concentration level. Usually a dispersion of the modified starch flocculant containing from about 0.5 to about 2% by weight of flocculant is added to the tailings in an amount of from about 15 to about 200 ppm, preferably about 25 to about 100 ppm of tailings. However, the flocculating amount to be used will vary with the particular flocculant and frequently a lower amount is more effective than a higher amount.

In order to more fully illustrate the invention the following specific examples of preparation and use of the flocculants is given.

EXAMPLES

Preparation Of Starch Dispersion

Powdered potato starch (2 g.) and 400 ml. of tap water are placed in a sealed non-reactive container (TEFLON preferred) and heated at 150° C. for about 2.5 hours.

Methylation With Methyl Iodide At 150° C.

A volume of 400 ml. of the above dispersion is poured into a Teflon container and 10 ml. of methyl iodide and 0.2 g. silver oxide are added. The container is then sealed and held in an oven at 150° C. for 45 minutes to allow the contents to reach this temperature. The heating is then continued for a further 2 hours at 150° C. to effect methylation. The container is then removed from the oven and is cooled in a water bath for 2 to 3 hours to give the methylated starch product.

To 100 ml. of the methylated starch 0.045 g. lime is added for the purpose of buffering the flocculant and the container is held at 150° C. for one hour. This methylated starch flocculant is designated "0.5% PM 150°" which stands for a 0.5% dispersion of methylated potato starch prepared at 150° C.

Methylation At 85° C. and 50° C.

In a similar manner, the starch dispersion is methylated at 85° C. and at 50° C. and the products designated "0.5% PM 85°" and "0.5% PM 50°" respectively.

Sulfonation Procedure

To 200 ml. of methylated starch product 0.3 g. of sodium bisulfite and 0.09 g. of lime are added and the contents are heated for one hour at 150° C. to effect sulfonation. This material is designated "0.5% PMS 150°".

Hydrolysis Procedure

A quantity of 0.075 g. of trisodium phosphate and 0.05 g. of sodium aluminate is added to 100 ml. of the methylated-sulfonated potato starch (0.5% PMS 150°) and the mixture is heated at 150° C. for one hour to effect hydrolysis. This material is the preferred flocculant of the invention and is designated "0.5% PMSH 150°" which stands for the 0.5% potato starch dispersion which has been methylated, sulfonated and hydrolyzed at 150° C.

Methylation With Dimethyl Sulfate At 50° C.

A 4% dispersion of potato starch in 400 ml. of tap water is heated to 50° C. and 1.52 g. lime is added and stirred for one minute, followed by the addition of 2.4 ml. of dimethyl sulfate. The contents are then stirred and heated at 50° C. for two hours to methylate.

The above procedures are also used to modify dasheen starch and these modified starches are designated by the same coding except that the "P" for potato starch is replaced by "D" for dasheen starch.

Evaluation Of The Modified Starch

The modified starches of the invention are tested to determine their ability to flocculate digested tailings from bauxite operations. The flocculation tests are settling tests analyzed by means of Kynch analysis which gives a settling time called "ultimate time" (Tu). Tu is an indicator of the duration required for sediment to reach close to the ultimate height and this parameter is used to evaluate the efficiency of settling aids in suspensions. The lower the value of Tu the better the settling.

Another parameter for the expression of settling efficiency of sediments is called "Unit Area" which is defined as follows:

Unit Area = $Tu/(C_o \times H_o)$ where:
$C_o$ = initial solids concentration (ton/cu.ft.)
$H_o$ = initial height (ft.)
Tu = ultimate time (days)

Unit Area is expressed as sq.ft./ton/day. This is the area required to settle one ton of solids per day. Small Unit Area indicates efficient settling.

To carry out the test the bauxite tailings are well mixed and quickly poured into 100 ml. graduated cylinders. The tailings in the cylinders are treated with 0.1 ml. of a 4% aluminum sulfate solution and the contents in the cylinders are mixed by inverting three times. This is immediately followed by treatment with 100 ppm of the test dispersion containing 0.5% flocculant. Then, the contents in the cylinder are mixed by inverting them five times. Immediately thereafter, the sediment height vs time to settle is observed and recorded at intervals.

The following table illustrates typical Tu values and Unit Area values for controls and for the starch flocculants used in the process of the invention.

TABLE I

Digested Jamaican Bauxite Tailings Treated with Methylated Starch Derivatives as Flocculants

| Ex. No. | Modified Starch | PPM | Tu (Min) | Unit Area (Sq. Ft./Ton/Day) |
|---|---|---|---|---|
| Untreated: | | 0 | 195.00 | 101.39 |
| 1. | 0.5% PM 50° | 100 | 55.00 | 28.59 |
| 2. | 0.5% PM 50° | 25 | 56.50 | 29.37 |
| 3. | 0.5% PMH 50° | 100 | 47.50 | 24.70 |
| 4. | 0.5% PMS 50° | 100 | 62.30 | 32.29 |
| 5. | 0.5% PMSH 50° | 100 | 60.40 | 31.40 |
| 6. | 0.5% PM 85° | 100 | 250.00 | 130.00 |
| 7. | 0.5% PMH 85° | 100 | 250.00 | 127.30 |
| 8. | 0.5% PMS 85° | 25 | 70.00 | 36.39 |
| 9. | 0.5% PMS 85° | 100 | 270.00 | 140.00 |
| 10. | 0.5% PMSH 85° | 100 | 280.00 | 145.60 |
| 11. | 0.5% PM 150° | 100 | 265.00 | 137.80 |
| 12. | 0.5% PMH 150° | 100 | 265.00 | 137.80 |
| 13. | 0.5% PMS 150° | 100 | 270.00 | 140.40 |
| 14. | 0.5% PMSH 150° | 100 | 270.00 | 140.40 |

As can be seen by the data in the above Table I, the methylated potato starch derivatives prepared at 50° C. are all very effective flocculants for the bauxite tailings when used at 25 to 100 ppm (Examples 1 to 5). The starch compositions made at temperatures of 85° C. and above, however, are not very effective at a dosage of 100 ppm, but are effective at 25 ppm (compare Example 8 with 10).

Table II which follows shows the effectiveness of the methylated starch derivatives when made from dasheen starch. Dasheen starch is readily obtained from the dasheen plant which is the common name for the plant Colocasia esculenta, including the variety antiquorum (taro). The plants are among the few edible members of the aroid family (Ayaceae) and are native to Southeastern Asia and Malaysia. The edible corms (underground stems) from which the starch is obtained support a cluster of large leaves 4 to 6 feet long often called elephant's ears. Separation of the dasheen starch from the root is well known in the art and need not be repeated in detail here.

TABLE II

Digested Jamaican Bauxite Tailings Treated with Methylated Dasheen Starch Derivatives as Flocculants

| Ex. No. | Modified Starch | PPM | Tu (Min) | Unit Area (Sq. Ft./Ton/Day) |
|---|---|---|---|---|
| Untreated: | | 0 | 195.00 | 101.39 |
| 15. | 0.5% DM 50° | 100 | 25.00 | 13.00 |
| 16. | 0.5% DMH 50° | 100 | 25.00 | 13.00 |
| 17. | 0.5% DMS 50° | 100 | 25.00 | 13.00 |
| 18. | 0.5% DMSH 50° | 100 | 25.00 | 13.00 |
| 19. | 0.5% DM 85° | 100 | 33.00 | 17.20 |
| 20. | 0.5% DMH 85° | 100 | 25.00 | 13.00 |
| 21. | 0.5% DMS 85° | 100 | 37.00 | 19.20 |
| 22. | 0.5% DMSH 85° | 100 | 25.00 | 13.00 |
| 23. | 0.5% DM 150° | 100 | 225.00 | 117.00 |
| 24. | 0.5% DMH 150° | 100 | 225.00 | 117.00 |
| 25. | 0.5% DMS 150° | 100 | 235.00 | 122.00 |
| 26. | 0.5% DMSH 150° | 100 | 155.00 | 80.00 |

As can be seen from Table II, temperature of preparation is less significant with the dasheen than with the potato starch since preparation of the dasheen starch derivatives at 85° C. does not adversely affect flocculation performance as it does with potato starch at this temperature. At a preparation temperature of 150° C., however, the dasheen starch derivatives are also adversely affected.

When similar methylated starch compositions are made from wheat, corn, yam, and cassava starches, flocculant activity comparable to the above examples is also observed.

The starch compositions of the invention enables better liquor clarification and greater sediment densification to be obtained than has been possible heretofore. As a result, less washing steps in the counter current decantation system for the red mud are required and this results in a more economical process both in cost and time of operation.

We claim:

1. A process of the flocculation of aqueous dispersions of mineral wastes which comprises adding to said waste dispersion a flocculating amount of a methylated starch containing acetal and methoxy groups.

2. The process of claim 1 wherein the methylated starch is hydrolyzed.

3. The process of claim 1 wherein the methylated starch is sulfonated.

4. The process of claim 3 wherein the sulfonated starch is hydrolyzed.

5. A process for the flocculation of red mud from an alumina liquor which comprises treating said liquor with a flocculating amount of a starch which has been modified by being methylated at a temperature of from about 50° to about 85° C. to introduce acetal and methoxy groups.

6. The process of claim 5 wherein the methylated starch is sulfonated.

7. The process of claim 5 wherein the starch is methylated with methyl iodide in the presence of silver oxide.

8. The process of claim 6 wherein the sulfonation is carried out with sodium bisulfite.

9. The process of claims 5, 6, 7 or 8 wherein the methylated starch compound is hydrolyzed.

10. The process of claims 5, 6, 7 or 8 wherein the starch is dasheen starch.

11. The process of claims 5, 6, 7 or 8 wherein the starch is a potato starch and the modification reaction is about 50° C.

12. A flocculant composition comprising a starch which has been methylated to introduce acetal and methoxy groups and subsequently sulfonated, said methylation and sulfonation being carried out at a temperature from about 50° to about 85° C.

13. The flocculant composition of claim 12 wherein the methylatedsulfonated starch is further hydrolyzed.

14. The flocculant composition of claims 12 or 13 wherein the starch is potato, wheat, corn, yam, cassava or dasheen starch.

15. The process of claim 10 wherein the methylated starch compound is hydrolyzed.

16. The flocculant composition of claims 12 or 13 wherein the starch is potato, wheat, corn, yam, cassava, or dasheen starch and the methylation is carried out with methyl iodide in the presence of silver oxide and the sulfonation is carried out with sodium bisulfite.

* * * * *